(12) United States Patent
Sleegers

(10) Patent No.: US 11,649,118 B2
(45) Date of Patent: May 16, 2023

(54) CONVEYOR ASSEMBLY FOR ALIGNING PRODUCTS

(71) Applicant: Sleegers Techniek B.V., Nieuwkuijk (NL)

(72) Inventor: Hubertus Theodorus Wilhelmus Sleegers, Nieuwkuijk (NL)

(73) Assignee: SLEEGERS TECHNIEK B.V., Nieuwkuijk (NL)

( * ) Notice: Subject to any disclaimer, the term of this patent is extended or adjusted under 35 U.S.C. 154(b) by 167 days.

(21) Appl. No.: 17/273,167

(22) PCT Filed: Sep. 4, 2019

(86) PCT No.: PCT/NL2019/050572
§ 371 (c)(1),
(2) Date: Mar. 3, 2021

(87) PCT Pub. No.: WO2020/050720
PCT Pub. Date: Mar. 12, 2020

(65) Prior Publication Data
US 2021/0323775 A1 Oct. 21, 2021

(30) Foreign Application Priority Data

Sep. 4, 2018 (NL) ..................................... 2021557

(51) Int. Cl.
*B65G 47/26* (2006.01)
*B65B 35/44* (2006.01)
(Continued)

(52) U.S. Cl.
CPC ............ *B65G 47/26* (2013.01); *B65B 25/065* (2013.01); *B65B 35/44* (2013.01); *B65G 47/648* (2013.01);
(Continued)

(58) Field of Classification Search
CPC ...... B65G 47/26; B65G 47/46; B65G 47/468; B65B 35/44; B65B 25/065
(Continued)

(56) References Cited

U.S. PATENT DOCUMENTS 3,982,625 A * 9/1976 Wentz .................... B65G 47/50
198/572
4,244,461 A * 1/1981 Fischer .................. B65H 29/58
198/456

(Continued)

FOREIGN PATENT DOCUMENTS

JP 2012-217354 11/2012

OTHER PUBLICATIONS

International Search Report for PCT/NL2019/050572 dated Jan. 8, 2020, 8 pages.

(Continued)

*Primary Examiner* — Douglas A Hess
(74) *Attorney, Agent, or Firm* — Workman Nydegger

(57) ABSTRACT

Conveyor assembly for in a lying position, in X-direction from an inlet to an outlet, conveying products serially supplied in transverse series comprising: —an inlet conveyor situated on the inlet side; —a drive for driving the inlet conveyor for in X-direction conveying the transverse series of products lying thereon; —a first recording device for recording the position of the products within a transverse series, in a Y-direction that is horizontally transverse to the X-direction; —a first correction device for influencing the positions in Y-direction of the products within a transverse series; —a programmable control unit which is configured for receiving and processing the recording data from the first recording device and for controlling the first correction device, if the products within the recorded transverse series are not in the wanted position in Y-direction, —wherein the (Continued)

first correction device comprises a first conveyor and a first drive for it for conveying the products in X-direction, —wherein the first conveyor comprises a number of first sub-conveyors positioned next to each other for respective conveyance in X-direction of the products situated in a transverse series, according to paths that are situated next to each other, —wherein the first correction device further comprises first sub-drives for individually from each other setting the upstream ends of the first sub-conveyors in position in Y-direction, which first sub-drives can be controlled for that purpose by the control unit in response to the recording data received from the first recording device relating to the positions of the products in a transverse series in Y-direction, —wherein the first conveyor is situated downstream of the inlet conveyor.

21 Claims, 4 Drawing Sheets

(51) Int. Cl.
*B65B 25/06* (2006.01)
*B65G 47/64* (2006.01)

(52) U.S. Cl.
CPC ................ *B65G 2201/0202* (2013.01); *B65G 2203/0233* (2013.01); *B65G 2203/041* (2013.01)

(58) Field of Classification Search
USPC .......................................... 198/369.5, 781.06
See application file for complete search history.

(56) References Cited

U.S. PATENT DOCUMENTS

| | | | | |
|---|---|---|---|---|
| 5,168,978 | A * | 12/1992 | Cox | B65G 47/71 |
| | | | | 198/817 |
| 6,347,697 | B1 * | 2/2002 | Ouellette | B65G 43/08 |
| | | | | 198/369.5 |
| 6,851,250 | B2 * | 2/2005 | Whitby | B65B 57/14 |
| | | | | 198/572 |
| 8,549,966 | B2 * | 10/2013 | Hansen | B26D 7/0625 |
| | | | | 83/77 |
| 8,955,664 | B2 * | 2/2015 | Lim | B65G 47/648 |
| | | | | 198/370.1 |
| 9,265,261 | B2 * | 2/2016 | Haas | B65G 39/16 |
| 9,764,490 | B2 * | 9/2017 | Weber | B26D 5/20 |
| 10,549,925 | B2 * | 2/2020 | Levine | B65G 19/02 |
| 11,059,677 | B2 * | 7/2021 | Sleegers | B65G 23/44 |
| 11,064,705 | B2 * | 7/2021 | Van Blokland | B65G 47/084 |
| 11,198,565 | B2 * | 12/2021 | Fox | B65G 15/50 |
| 2007/0089967 | A1 | 4/2007 | Pryor et al. | |
| 2009/0188358 | A1 | 7/2009 | Hansen et al. | |

OTHER PUBLICATIONS

Written Opinion of the ISA for PCT/NL2019/050572 dated Jan. 8, 2020, 7 pages.

* cited by examiner

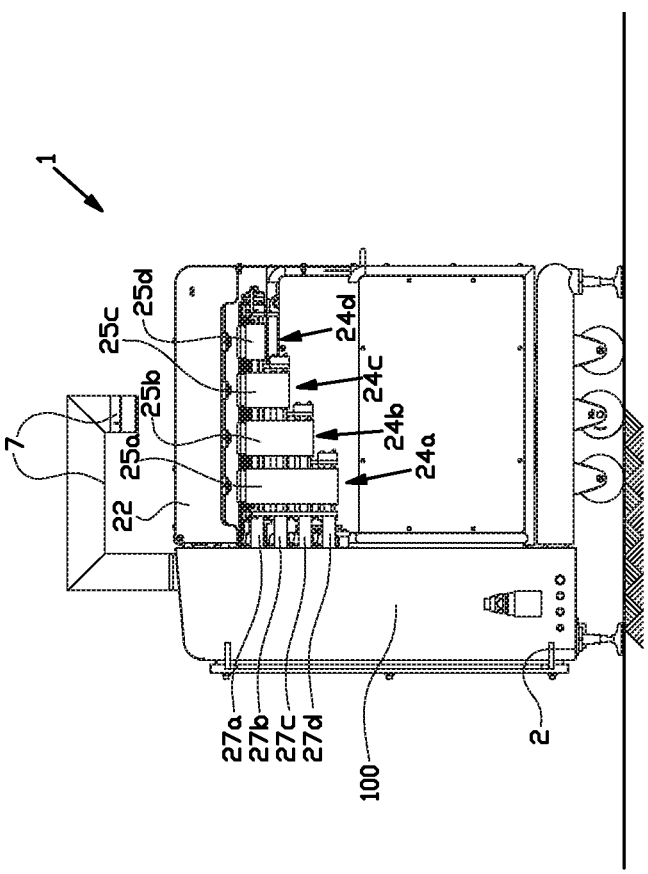
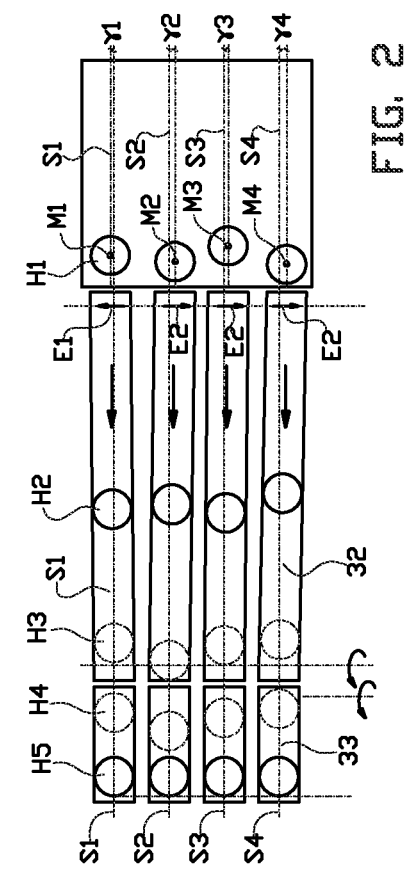
FIG. 1C
FIG. 2

CONVEYOR ASSEMBLY FOR ALIGNING PRODUCTS

This application is the U.S. national phase of International Application No. PCT/NL2019/050572 filed Sep. 4, 2019 which designated the U.S. and claims priority to NL Patent Application No. 2021557 filed Sep. 4, 2018, the entire contents of each of which are hereby incorporated by reference.

BACKGROUND OF THE INVENTION

The invention relates to a conveyor assembly for conveying products, in particular food products such as hamburgers, that are supplied in transverse series.

For controlled manipulation of products, in particular when it concerns packaging products, it may be desirable to be able to influence the position of such products accurately. This may in particular be of importance in the manipulation of food products resulting from a preparation process in which the mutual positions of the products may vary. Such is for instance the case in the industrial preparation and formation of so-called "home-made" quality hamburgers, wherein a series of portions of minced meat separated from a supply, is collected on a conveyor and shaped into flat patties between two press belts that are situated one above the other. When the portions of minced meat fall on the conveyor, it is possible that the drop locations within a transverse series are not aligned and furthermore the positions may be different for consecutive portions. The positions may change during the flattening process. When they leave the press belts, the positions of the burgers are irregular and not exactly known. This is disadvantageous to the process of stacking and packaging the burgers in trays or other containers, because stacks consisting of burgers that have shifted positions relative to each other may be formed. Such stacks may not fit in the container in which they are intended to be placed. If such a stack can indeed be placed in the container, its look will not be conducive to sales. When being packaged individually, an effort will have to be made to prevent the burgers form ending up at an unwanted place in the trays. This slows down the packaging process.

SUMMARY OF THE INVENTION

It is an object of the invention to provide a conveyor assembly that may improve on this.

It is an object of the invention to provide a conveyor arrangement that may improve on this.

It is an object of the invention to provide a method that may improve on this.

According to one aspect, the invention provides a conveyor assembly for in a lying position, in X-direction from an inlet to an outlet, conveying products serially supplied in transverse series comprising:
an inlet conveyor situated on the inlet side;
a drive for driving the inlet conveyor for in X-direction conveying the transverse series of products lying thereon;
a first recording device for recording the position of the products within a transverse series, in a Y-direction that is horizontally transverse to the X-direction;
a first correction device for influencing the positions in Y-direction of the products within a transverse series;
a programmable control unit which is configured for receiving and processing the recording data from the first recording device and for controlling the first correction device, if the products within the recorded transverse series are not in a wanted position in Y-direction,
wherein the first correction device comprises a first conveyor and a first drive for it for conveying the products in X-direction,
wherein the first conveyor comprises a number of first sub-conveyors positioned next to each other for respective conveyance in X-direction of the products situated in a transverse series, according to paths that are situated next to each other,
wherein the first correction device further comprises first sub-drives for individually from each other setting the upstream ends of the first sub-conveyors in position in Y-direction, which first sub-drives can be controlled for that purpose by the control unit in response to the recording data received from the first recording device relating to the positions of the products in a transverse series in Y-direction, wherein the first conveyor is situated downstream of the inlet conveyor.

In a preferred embodiment the conveyor assembly further comprises:
a second recording device for recording the position of the products within a transverse series, in X-direction;
a second correction device for influencing the positions in X-direction of the products within a transverse series;
wherein the programmable control unit is also configured for receiving and processing the recording data from the second recording device and for controlling the second correction device, if the products within the recorded transverse series are not in the wanted position in X-direction,
wherein the second correction device comprises a second conveyor and a second drive for it for conveying the products in X-direction,
wherein the second conveyor comprises a number of second sub-conveyors positioned next to each other for respective conveyance in X-direction of the products situated in a transverse series, according to paths that are situated next to each other,
wherein the second drive of the second correction device comprises second sub-drives for driving the second sub-conveyors individually from each other for in X-direction aligning the products within a transverse series, which second sub-drives can be controlled for that purpose by the control unit in response to the recording data received from the second recording device relating to the positions of the products in a transverse series in X-direction,
wherein the second conveyor is situated downstream of the inlet conveyor and preferably downstream of the first conveyor.

That way the products within a transverse series can be brought from an unknown, uncontrolled position into a wanted, known position in Y-direction, and preferably also in X-direction, which will improve the further processing. As a consequence a subsequent process, such as a stacking or packaging process can be carried out in a more controlled manner and therefore at a quicker pace. A group of transverse series of products can thus be brought from a somewhat irregular line-up into a line-up having parallel, mutually aligned longitudinal series of products in X-direction, in the preferred embodiment into a regular matrix line-up, aligned in both longitudinal direction and transverse direction.

For each subsequent transverse series the upstream ends of the first sub-conveyors can be set again to the actual Y-position of the products in said subsequent transverse series.

In an advantageous embodiment, the downstream ends of the first sub-conveyors with their center lines are situated at mutually equal distances from each other in Y-direction, corresponding to the wanted positions. As a result, at the downstream end, the mutual positions in Y-direction within a transverse series will already be fixed, and only the upstream end of a first sub-conveyor will, if required, needs to be set for the correct reception of a product. Once a product of a first transverse series has been received, it will already be possible to carry out the process of recording the position, setting in Y-direction and receiving a product of the subsequent transverse series. Several consecutive products can then be conveyed in X-direction on a first sub-conveyor, as a result of which the pace of the process is improved.

The wanted positions in Y-direction can be fixed if the conveyor assembly is dedicated to one specific product. In that case, those positions will be known to the control unit in advance. If batches of different products are to be processed, in one embodiment, prior to each processing process of a batch of products, the wanted positions in Y-direction of the downstream ends of the first sub-conveyors can be set at the positions as desired for the batch in question. Those wanted positions can then be entered in the control unit, manually or automatically, namely linked to the setting.

If the first conveyor is situated upstream of the second conveyor, the products in a transverse series can be discharged in perfectly parallel directions (parallel to the X-direction) to a further conveyor or other processing device.

The first recording device can be positioned for position recording of the products lying on the inlet conveyor.

The first recording device may comprise a camera, such as a line scan camera. Other arrangements for determining positions will be known to the expert and may be worth considering within the invention.

In one embodiment, the control unit is also configured for calculating an indication of the shape and/or size of the products on the basis of the recording data from the first recording device. That way a Y-reference point of the products can be calculated, such as a surface center of gravity, which may also serve as an indication for the position in X-direction. The data regarding shape and/or size can also be used for a selection in the products. For that purpose, the control unit can also be configured for comparing the calculated indication of the shape and/or size of the products to entered target values for the shape and/or size of the products,
wherein the conveyor assembly further comprises:
a removal device for removing transverse series of products that consist of one or more products, which device is controllable by the control unit in dependence on the outcome of the comparison made by the control unit in terms of the shape and/or size. If the outcome of the comparison in the control unit indicates that the said indication of the shape and/or size of at least one of the products of a transverse series is different from the entered target values for the shape and/or size, the control unit operates the removal device to remove the transverse series in question from the process flow, for instance by, in case of a removal conveyor, tilting down the conveyor surface for the transverse series in question for a short while so as to drop the transverse series.

The removal device, in particular comprising a removal conveyor, can be situated in between the inlet conveyor and the first conveyor, so that only the wanted products are offered to the first correction device.

The second recording device can therefore coincide with the first recording-device.

It is also possible to situate the second recording device additionally or alternatively immediately upstream of the second correction device, so that a change in the X-position of a product in the process that is upstream thereof can be included in the correction, if any. When considered in X-direction, the second recording device can be situated in between the first and the second conveyors. If the second recording device is plural, that means both coinciding with the first recording device as well as being situated immediately upstream of the second correction device, the control unit will be configured for giving precedence to the data coming from the recordings immediately upstream of the second correction device as those data are more recent.

The second recording device may be configured for detecting the leading edges of the products,
wherein the control unit is configured for, on the basis of the recording data from the second recording device, individually controlling the second sub-drives to align the leading edges of the products within a transverse series, parallel to the Y-direction.

The upstream ends of the first sub-conveyors may comprise end-circulation rollers, that are individually movable in Y-direction by the first sub-drives. These upstream end-circulation rollers can be supported on carriages that are slidable in Y-direction on cross guides. The respective first sub-drives can be situated offset relative to each other in X-direction. They may for instance comprise spindles that operatively engage onto the carriages in question.

A displacement in Y-direction of the upstream ends of the first sub-conveyors, whereas their downstream ends remain situated at fixed mutual center-to-center distance, wherein therefore both end circulation rollers of the first sub-conveyor shift relative to each other in Y-direction, yet with their center lines remain parallel to each other and to the Y-direction, can be facilitated if the first sub-conveyors provide a conveyance surface that is elastically stretching in X-direction. The conveyance surface can then follow the displacement while retaining its levelness.

In one embodiment, the first sub-conveyors are composed of a number of parallel cords or strings. This also facilitates the displacement mentioned above, and the levelness can be retained to a sufficient degree.

According to a further aspect the invention provides a conveyor arrangement comprising:
a conveyor assembly according to the invention,
a discharge conveyor connecting to the outlet, in particular to the downstream end of the second conveyor, and
a container conveyor for conveying containers, which is positioned for receiving products, supplied by the discharge conveyor, in the containers.

The conveyor arrangement can be supplemented with a device for making food products, in particular for making hamburgers, which device is positioned for discharging the food products made to the inlet conveyor.

According to a further aspect the invention provides a method for aligning products that are conveyed in transverse series in X-direction, comprising the following steps:
a)—determining an indication of the position in a horizontal Y-direction, that is transverse to the X-direction, of each product in a transverse series;
b)—in a control unit comparing the determined Y-position indications to the wanted positions in Y-direction of the products in a transverse series as known to the control unit;
c)—once the position indication has been determined, conveying the products in the transverse series in X-direction on a first conveyor comprising a number of first sub-conveyors positioned next to each other, with each product within a transverse series on its individual first sub-conveyor, d)—prior to receiving the products of the transverse series, on the basis of the outcome of the above-mentioned comparison, having the positions in Y-direction of the upstream ends of the first sub-conveyors altered or not, on an individual basis, by the control unit, so that those upstream ends, in particular their centers, are/become aligned with the determined Y-position indications and as a result with the supplied products, and e)—discharging the products of a transverse series from the downstream ends of the first sub-conveyors to a next conveyor, wherein within the transverse series the products are situated at the wanted positions in Y-direction.

In that case, in one embodiment, the position in Y-direction of the downstream ends of the first sub-conveyors can remain unchanged, also during changing the conveyance direction. The centers considered in Y-direction, of the downstream ends of the first sub-conveyors can then determine the known, wanted Y-positions.

It is possible that, prior to step e) being carried out for the products of a transverse series, the steps a)-d) are already carried out for the subsequent transverse series of products as well. The corrections of the Y-positions in consecutive transverse series will then overlap each other in terms of time.

In one embodiment, the consecutive transverse series of products on the first conveyor are kept at a mutual following distance that is shorter than the length of the first sub-conveyors in X-direction.

Immediately or shortly after the recording of a first transverse series of products, the first conveyors can be set at their upstream ends for a correct, targeted reception of the products of the subsequent transverse series, when the outcome of the above-mentioned comparison has been obtained.

In one embodiment, wherein at their upstream ends and their downstream ends the first sub-conveyors comprise first and second end rollers, the center lines of those first and second end rollers are always kept perfectly parallel to each other.

In a further development, the method according to the invention comprises the following steps:

f)—determining an indication of the position in the X-direction of each product in a transverse series;

g)—comparing the determined X-position indications to a reference line in Y-direction;

h)—once the position indication has been determined, conveying the products in the transverse series in X-direction on a second conveyor comprising a number of second sub-conveyors positioned next to each other, each product within a transverse series on its individual second sub-conveyor, i)—after receiving the products of the transverse series, individually controlling the second sub-conveyors on the basis of the outcome of the aforesaid comparison, for, considered in Y-direction, aligning the products within the transverse series.

In one embodiment, step f) is carried out after step d), wherein in particular the next conveyor in step e) is the second conveyor of step h).

The products can be food products. The food products can be burgers made by passing portions of prepared minced meat in between two press belts.

In a further development of the method according to the invention, after having been made to lie at the same level in X-direction and with their centers having been placed at mutually equal intermediate distances in Y-direction, the products of a transverse series are discharged to a series of containers.

The wanted positions in Y-direction can be determined by the positions in Y-direction of the center lines (in X-direction) of the downstream ends of the first sub-conveyors and/or those of the second sub-conveyors. That way the wanted positions can already be known to the control unit ex factory. If setting the wanted positions in Y-direction is possible, then the set position can automatically be passed on to the control unit or be entered into it manually.

In accordance with what has been described above, in one embodiment, an indication of the shape and/or size of the products can be calculated by the control unit on the basis of the recording data from the first recording device. That way a Y-reference point of the products can be calculated, such as a surface center of gravity, that may also serve as an indication for the position in X-direction. The data regarding shape and/or size can also be used for a selection in the products. For that purpose, the control unit can compare the calculated indication of the shape and/or size of the products to entered target values for the shape and/or size of the products, wherein the control unit in dependence on the outcome of the comparison made by the control unit in terms of the shape and/or size may or may not control a removal device for removing transverse series of products that consist of one or more products. If the outcome of the comparison in the control unit indicates that the said indication of the shape and/or size of at least one of the products of a transverse series is different from the entered target values for the shape and/or size, the control unit operates the removal device to remove the transverse series in question from the process flow, for instance by, in case of a removal conveyor, tilting down the conveyor surface for the transverse series in question for a short while so as to drop the transverse series.

Said removal process can take place between the inlet conveyor and the first conveyor, so that only the wanted products are offered to the first correction device.

The aspects and measures described in this description and the claims of the application and/or shown in the drawings of this application may where possible also be used individually. Said individual aspects and other aspects may be the subject of divisional patent applications relating thereto. This particularly applies to the measures and aspects that are described per se in the sub claims.

BRIEF DESCRIPTION OF THE DRAWINGS

The invention will be elucidated on the basis of an exemplary embodiment shown in the attached drawings, in which:

FIGS. 1A, 1B and 1C, show a front view, a top view and an end view, respectively, of a conveyor assembly according to the invention;

FIG. 2 shows a schematic view in top view of a process of correcting positions of products in the assembly of FIGS. 1A and 1B.

DETAILED DESCRIPTION OF THE DRAWINGS

Figure 1A:
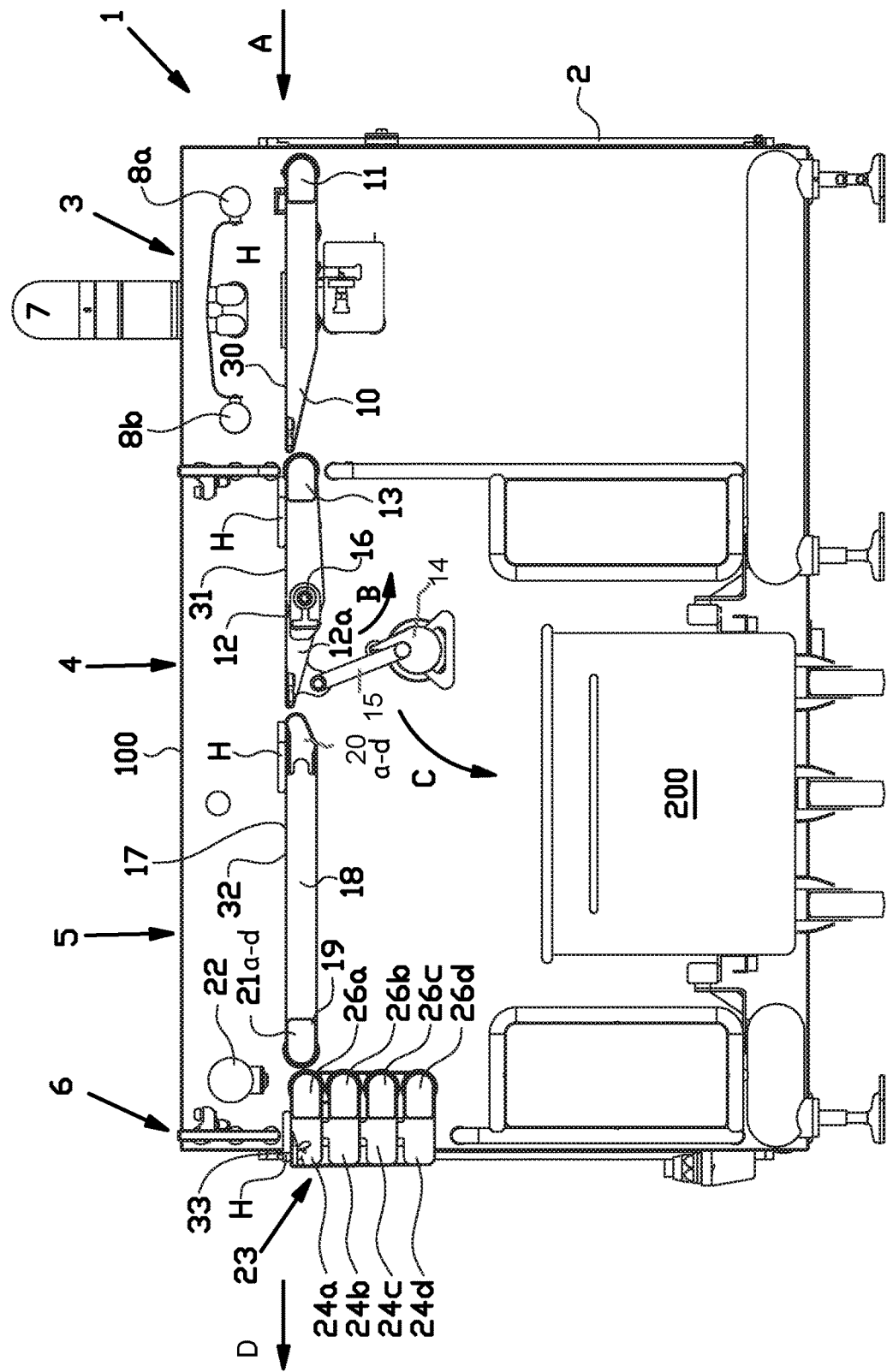
Figure 1B:
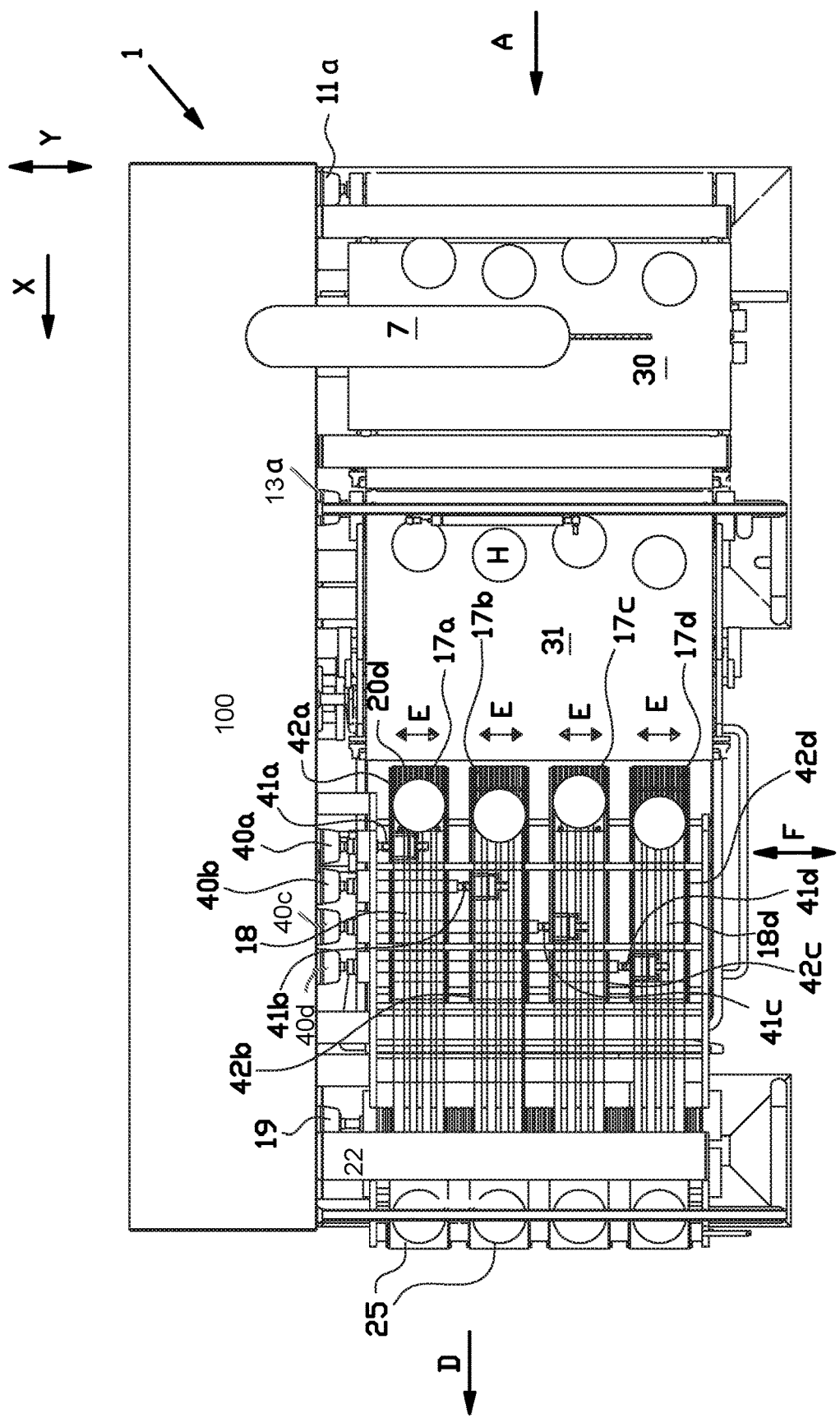

The conveyor assembly 1 of FIGS. 1A and 1B comprises a frame 2 in which are accommodated a scanning station 3, a removal station 4, a Y-correction station 5 and an X-correction station 6. The X-direction is the conveyance direction, the Y-direction is the horizontal perpendicular to the X-direction.

The scanning station 3 comprises a line scan camera 7 and camera lights 8*a,b*. The camera 7 is positioned over a conveyance surface 30 of an inlet conveyor 10 provided with a drive roller 11 that is driven by a motor 11*a*. The camera 7 provides measurement data to a programmable control unit 100, in which those data can be processed into an image of the products situated on the conveyance surface, with which an indication of the X-positions and Y-positions of the products can be obtained.

In the removal station 4, that is situated immediately downstream of the scanning station 3, a removal conveyor 12 is positioned, which is provided with a drive roller 13 driven by a motor 13*a* and which defines a conveyance surface 31. The conveyor 12 is divided, wherein the downstream part 12*a* can be hinged downward and upward again about hinge 16, direction B, when operating drive 14, via link rod 15 which connects the drive 4 to the part 12*a*.

In the Y-correction station 5 (first correction device), situated immediately downstream of the removal station 4, a first conveyor 18 is positioned, which is plural, namely having a number of first sub-conveyors 18*a-d*, in this case four, that are positioned next to each other. The sub-conveyors 18*a-d* each comprise a group of mutually parallel strings 17*a-d*, forming a conveyance surface 32, and circulating about upstream end rollers 20*a-d* and downstream end rollers 21*a-d*. The strings are driven by a first drive (motor) 19 that drives the downstream end rollers 21*a-d* of the first sub-conveyors 18*a-d*.

As can be seen in FIG. 1B, each first sub-conveyor 18*a-d* comprises a carriage 42*a-d*, which comprises the upstream end roller 20*a-d* of the respective sub conveyor 18*a-d*. Each carriage 42*a-d* is guided so as to be slidable in Y-direction on permanent cross rods and is attached to the outer end of a respective spindle 41*a-d*, which can be retracted and extended in directions F, parallel to the Y-direction by servomotors 40*a-d*.

Immediately downstream of the Y-correction station 5 an X-correction station 6 (second correction device) is situated, including a second conveyor 23, which is also plural having a number of second sub conveyors 24*a-d*, in this case also four, that are positioned next to each other, and have belts 25*a-d* that form a conveyance surface 33 and can each be individually and intermittently driven by respective drives 26*a-d*. The drives 26*a-d* comprise servomotors 27*a-d* and drive shafts 28*a-d*, that are situated one above the other (FIG. 1C) to keep the occupation of space in X-direction as limited as possible. The centers of the belts 25*a-d* as considered in Y-direction are situated on center lines S1-S4 (FIG. 2), which center lines are parallel to each other and to the X-direction when projected on a horizontal plane (top view). Said center lines can be known to the control unit 100 as wanted Y-positions for the products to be treated.

Above the transition between the Y-correction station 5 and the X-correction station 6, a transverse series of photocells 22 is positioned for detecting the leading edges of the products passing the transition in question. Thus, the second recording device for X-positions is plural here, with camera 7 and photocells 22.

Figure 3:
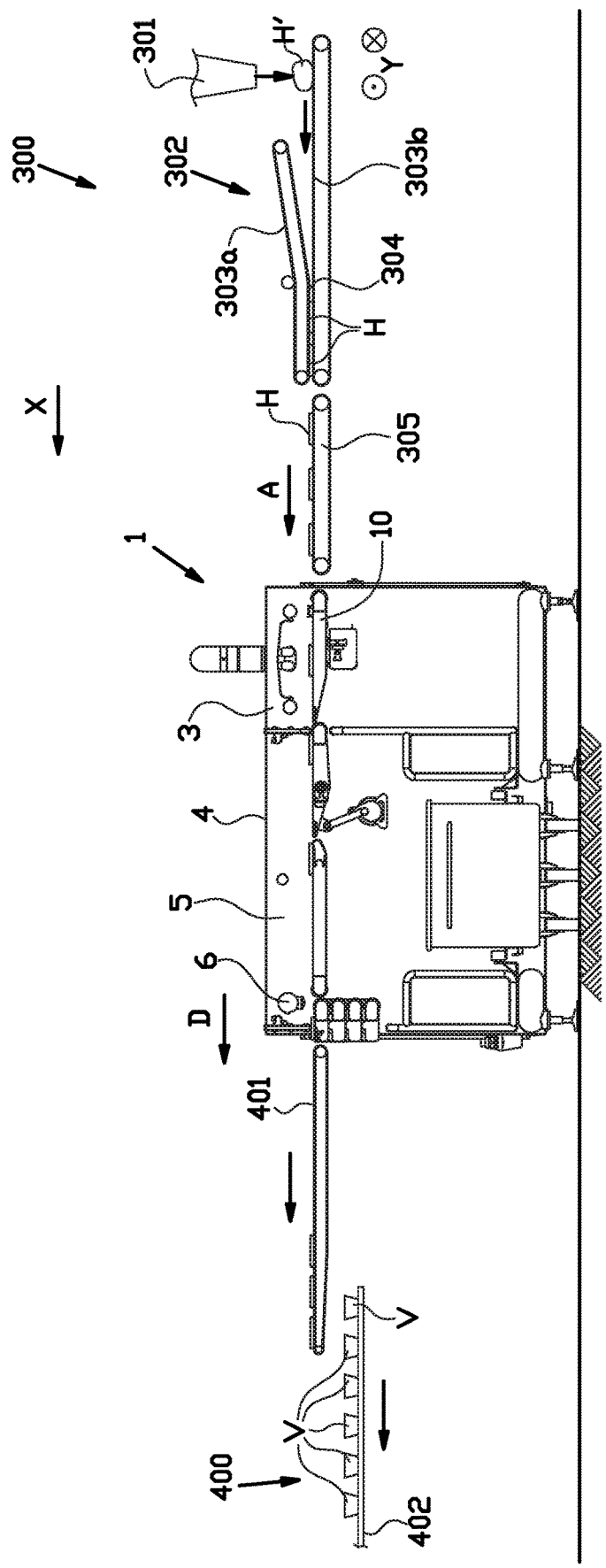
FIG. 3 shows a front view of an arrangement including the conveyor assembly of FIGS. 1A, 1B and 1C.

In FIG. 3, the conveyor assembly 1 is incorporated in a processing line for making and packaging hamburgers H. Preparation device 300 comprises a supply 301 for prepared minced meat, from which in this example each time four portions of minced meat H' are dropped next to each other to some extent (as transverse series in Y-direction) onto a bottom conveyor belt 303*b* of a flattening device 302. The flattening device 302 comprises an upper belt 303*a* which together with belt 303*b* defines a passage 304 for the portions H', which passage converges in A- and X-direction, when considered in the vertical plane. In the passage, the portions H' are transformed into hamburger patties H, which are conveyed in the direction A to the inlet conveyor 10 by the conveyor 305.

The outlet of the conveyor assembly 1 connects to a discharge conveyor 401 of a packaging device 400, where a container conveyor 402 for containers or trays V is positioned, which in this example conveys the containers V in transverse series of four in the same direction. The discharge conveyor 401 passes over the burgers in transverse series of four to the empty containers V provided on the conveyor 402. For this process of passing over a shuttle conveyor—not shown—can be used, to allow the burgers H to be dropped into the containers V at high speed during a retracting motion.

To have this process executed correctly, the conveyor assembly according to the invention is of benefit.

The drives 11*a*, 13*a*, 19, 40*a-d*, 26*a-d* and the recording equipment comprising camera 7 and sensors 22 are functionally connected to the central, programmable control unit 100. The wanted positions in X-direction and Y-direction within a transverse series are known to the control unit, as well as the margins within which shapes and sizes of the scanned burgers are accepted.

As illustrated in FIG. 2, the hamburgers H coming out of the device 300, may, within a transverse series, have varying positions both in the X-direction and in the Y-direction. On the conveyance surface 30 of the inlet conveyor 10, the burgers H situated in a transverse series are recorded line by line by the camera 7. These measurement data are processed in the control unit into an image for each burger H. In the control unit, the shape and size of said image are compared to entered target values/target ranges for the shape and size. Furthermore, an indication for the center—in Y-direction and in X-direction—of the respective burger, for instance the surface center of gravity, is calculated on the basis of that image. It is also possible that only the center as regards the Y-direction is calculated.

If the measured transverse series of burgers comprises at least one burger of which the outcome of the comparison is negative, the control unit 100 controls the motor 14, as a result of which the part 12*a* of the removal conveyor tilts downwards and the transverse series in question as a whole ends up in direction C in the removal bin 200.

For the transverse series of burgers H that have a comparison with a positive outcome indeed, the motors 40*a-d* are controlled in Y-direction by the control unit 100 on the basis of the calculated centers M1-M4 and the differences (δ1-δ4) relative to the center lines S1-S4 (see FIG. 2), in order to move the carriages 40*a-d* in Y-direction (in FIGS. 2, E1, E2, E2 and E2, respectively) to align the centers of the upstream ends of the first sub-conveyors 18*a-d* with the calculated centers M1-M4 of the burgers of transverse series H1. Because the downstream end rollers 21*a-d* of the first sub-conveyors 18*a-d* remain in their places in Y-direction, the first sub-conveyors 18*a-d*, considered in top view, then take up an inclined position relative to the X-direction. The center lines of the upstream end rollers 20*a-d* and of the downstream end rollers 21*a-d* of the first sub-conveyors 18*a-d* always remain parallel to each other and to the Y-direction.

Once the upstream end rollers 20*a-d* have been taken to the correct position in Y-direction, the burgers of transverse series H1 are received thereon and conveyed onwards. As soon as the burgers of transverse series H1 are positioned in their entirety on the strings 17a-d and the subsequent transverse series has been scanned and calculated, the control unit can once more control the motors 40a-d for alignment with the centers of the burgers of that subsequent transverse series.

In FIG. 2, the situation is shown in which the burgers of the transverse series H2 are situated halfway the first sub-conveyors 18a-d, and the burgers of the subsequent transverse series H1 are about to be received onto the first sub-conveyors. The first sub-conveyors 18a-d are continuously driven by the motor 19 via the end rollers 21a-d. The transverse series H3 preceding the transverse series H2, in the figure has arrived at the downstream end of the first sub-conveyors. As can be seen, the position in Y-direction for the burgers of that particular transverse series is the same, but the position in X-direction is not.

This difference is detected by the photocells 22 and passed on to the control unit 100. In the control unit it is calculated for which period of time the respective second sub-conveyor 23a-d needs to be driven for, at the downstream end of the second sub-conveyor, in Y-direction aligning the leading edge of the respective burger with the leading edges of the other burgers of the transverse series in question. This is shown by the transverse series H4, which has just been discharged to the second sub-conveyors, and by the transverse series H5, the leading edges of which burgers are in one transverse line with each other. The line-up in Y-direction has been effected earlier already for the burgers of the transverse series H3 and H4.

That way, at the outlet side of the conveyor assembly 1, the variable positions of the burgers in a transverse series have been converted into known and wanted positions of those burgers, as a result of which the further treatment of those burgers, such as the stacking with interleaving and placement in containers can be carried out in a reliable fashion.

The invention is/inventions are not at all limited to the embodiments discussed in the description and shown in the drawings. The above description has been included to illustrate the operation of preferred embodiments of the invention and not to limit the scope of the invention. Starting from the above explanation many variations that fall within the spirit and scope of the present invention will be evident to an expert. Variations of the parts described in the description and shown in the drawings are possible. They can be used individually in other embodiments of the invention(s). Parts of the various examples given can be combined together.

The invention claimed is:

1. A conveyor assembly for in a lying position, in X direction from an inlet to an outlet, conveying products serially supplied in transverse series comprising:
    an inlet conveyor situated on the inlet side;
    drive for driving the inlet conveyor for in X-direction conveying the transverse series of products lying thereon;
    a first recording device for recording the position of the products within a transverse series, in a Y-direction that is horizontally transverse to the X-direction;
    a first correction device for influencing the positions in Y direction of the products within a transverse series;
    a programmable control unit which is configured for receiving and processing the recording data from the first recording device and for controlling the first correction device, if the products within the recorded transverse series are not in the wanted position in Y-direction,
    a second recording device for recording the position of the products within a transverse series, in X-direction;
    a second correction device for influencing the positions in X direction of the products within a transverse series;
    wherein the first correction device comprises a first conveyor and a first drive for the first conveyor for conveying the products in X-direction,
    wherein the first conveyor comprises a number of first sub-conveyors positioned next to each other for respective conveyance in X-direction of the products situated in a transverse series, according to paths that are situated next to each other,
    wherein the first correction device further comprises first sub-drives for individually from each other setting the upstream ends of the first sub-conveyors in position in Y-direction, which first sub-drives can be controlled for that purpose by the control unit in response to the recording data received from the first recording device relating to the positions of the products in a transverse series in Y-direction,
    wherein the first conveyor is situated downstream of the inlet conveyor,
    wherein the first recording device is positioned for recording an image of the products that lie on the inlet conveyor,
    wherein the second recording device comprises a transverse series of photocells positioned above a transition between first correction device and the second correction device, the transverse series of photocells configured to detect leading edges of the products and to identify positional differences of products in both the Y-direction and the X-direction.

2. The conveyor assembly according to claim 1,
wherein the programmable control unit is also configured for receiving and processing the recording data from the second recording device and for controlling the second correction device if the products within the recorded transverse series are not in the wanted position in X-direction,
wherein the second correction device comprises a second conveyor and a second drive for the second conveyor for conveying the products in X-direction,
wherein the second conveyor comprises a number of second sub-conveyors positioned next to each other for respective conveyance in X-direction of the products situated in a transverse series, according to paths that are situated next to each other,
wherein the second drive of the second correction device comprises second sub-drives for driving the second sub-conveyors individually from each other for in X-direction aligning the products within a transverse series, which second sub-drives can be controlled for that purpose by the control unit in response to the recording data received from the second recording device relating to the positions of the products in a transverse series in X-direction,
wherein the second conveyor is situated downstream of the inlet conveyor.

3. The conveyor assembly according to claim 1,
wherein the downstream ends of the first sub-conveyors with their center lines are situated at mutually equal distances from each other in Y-direction, corresponding with the wanted positions.

4. The conveyor assembly according to claim 1,
wherein the first recording device comprises a camera,
wherein the control unit is also configured for calculating an indication of the shape and/or size of the products on the basis of the recording data from the first recording device,
wherein the control unit is configured for calculating a Y reference point of the products on the basis of the recording data from the first recording device.

5. The conveyor assembly according to claim 4,
wherein the control unit is also configured for comparing the calculated indication of the shape and/or size of the products to target values for the shape and/or size of the products as entered into the control unit,
wherein the conveyor assembly further comprises:
a removal device for removing transverse series of products that consist of one or more products, which device is controllable by the control unit in dependence on the outcome of the comparison made by the control unit with respect to the calculated indication and the entered target values of the shape and/or size of the products.

6. The conveyor assembly according to claim 5, wherein the removal device comprises a removal conveyor situated in between the inlet conveyor and the first conveyor.

7. The conveyor assembly according to claim 1,
wherein the second recording device is situated immediately upstream of the second correction device,
wherein considered in X-direction, the second recording device is situated in between the first and the second conveyors.

8. The conveyor assembly according to claim 7,
wherein the control unit is configured for, on the basis of the recording data from the second recording device, individually controlling the second sub-drives to align the leading edges of the products within a transverse series, parallel to the Y direction.

9. The conveyor assembly according to claim 1, wherein the upstream ends of the first sub-conveyors comprise circulation rollers, which are individually movable in Y-direction by the first sub-drives.

10. The conveyor assembly according to claim 9, wherein the upstream circulation rollers are supported on carriages that are slidable in Y-direction on cross guides.

11. The conveyor assembly according to claim 9, wherein the respective first sub-drives are situated offset relative to each other in X-direction.

12. A conveyor arrangement comprising:
a conveyor assembly according to claim 1,
a discharge conveyor connecting to the outlet, and a container conveyor for conveying containers, which is positioned for receiving products, supplied by the discharge conveyor, in the containers.

13. The conveyor arrangement according to claim 12, furthermore comprising a device for making food products, which device is positioned for discharging the food products made to the inlet conveyor.

14. A method for aligning products that are conveyed in transverse series in X-direction, comprising the following steps:
a)—determining an indication of the position in a horizontal Y direction, that is transverse to the X-direction, of each product in a transverse series;
b) in a control unit comparing the indications to the wanted positions determined Y-position in Y-direction of the products in a transverse series as known to the control unit;
c)—once said position indication has been determined, conveying the products in the transverse series in X-direction on a first conveyor comprising a number of first sub-conveyors positioned next to each other, each product within a transverse series on each said product's individual first sub-conveyor,
d)—prior to receiving the products of the transverse series, on the basis of the outcome of the abovementioned comparison, having the position in Y-direction of the upstream ends of the first sub-conveyors altered or not, on an individual basis, by the control unit, and
e)—discharging the products of a transverse series from the first sub-conveyors to a next conveyor, wherein within the transverse series the products are situated at the wanted positions in Y-direction.

15. The method according to claim 14, wherein at their upstream ends and their downstream ends the first sub-conveyors comprise first and second end rollers, and the center lines of those first and second end rollers are always kept perfectly parallel to each other.

16. The method according to claim 14, wherein the position in Y-direction of the downstream ends of the first sub-conveyors remains unchanged during changing the conveyance direction.

17. The method according to claim 14, wherein, prior to step e) being carried out for the products of a transverse series, the steps a)-d) are carried out for the subsequent transverse series of products.

18. The method according to claim 14, comprising the following steps:
f)—determining an indication of the position in the X-direction of each product in a transverse series;
g) comparing the determined X-position indications to the reference line in Y-direction;
h)—once the position indication has been determined, conveying the products in the transverse series in X-direction on a second conveyor comprising a number of second sub-conveyors positioned next to each other, each product within a transverse series on each said product's individual second sub-conveyor,
i)—after receiving the products of the transverse series, individually controlling the second sub-conveyors on the basis of the outcome of the aforesaid comparison, for, considered in Y direction, aligning the products within the transverse series.

19. The method according to claim 18, wherein step f) is carried out after step d).

20. The method according to claim 14, wherein the products are food products.

21. The method according to claim 14,
wherein, after having been made to lie at the same level in X direction and with their centers having been placed at mutually equal intermediate distances in Y-direction, the products of a transverse series are discharged to a series of containers.

* * * * *